United States Patent

Campbell et al.

(10) Patent No.: US 8,511,602 B2
(45) Date of Patent: Aug. 20, 2013

(54) DIFFERENTIAL VANE VEHICLE CONTROL

(75) Inventors: William T. Campbell, Albuquerque, NM (US); Armand Losinski, Albuquerque, NM (US); Jonathan Fleming, Blacksburg, VA (US)

(73) Assignee: Honeywell International Inc., Morristown, NJ (US)

( * ) Notice: Subject to any disclaimer, the term of this patent is extended or adjusted under 35 U.S.C. 154(b) by 939 days.

(21) Appl. No.: 12/695,878

(22) Filed: Jan. 28, 2010

(65) Prior Publication Data

US 2011/0180671 A1    Jul. 28, 2011

(51) Int. Cl.
*B64C 29/00* (2006.01)

(52) U.S. Cl.
USPC .................. 244/23 D; 244/23 R; 244/175

(58) Field of Classification Search
USPC .............. 244/23 D, 23 C, 53 B, 63, 75.1, 244/2, 17.13, 175; 73/170.14, 170.02
See application file for complete search history.

(56) References Cited

U.S. PATENT DOCUMENTS

| 3,369,773 | A | * | 2/1968 | Erwin | 244/12.3 |
|---|---|---|---|---|---|
| 3,861,822 | A | * | 1/1975 | Wanger | 415/147 |
| 4,071,207 | A | * | 1/1978 | Piasecki et al. | 244/23 D |
| 6,318,668 | B1 | * | 11/2001 | Ulanoski et al. | 244/12.5 |
| 7,149,611 | B2 | | 12/2006 | Beck et al. | |
| 7,883,051 | B2 | * | 2/2011 | Sammy | 244/12.5 |
| 8,083,557 | B2 | * | 12/2011 | Sullivan | 440/6 |
| 2004/0187475 | A1 | * | 9/2004 | Usab et al. | 60/204 |
| 2004/0197187 | A1 | * | 10/2004 | Usab et al. | 415/1 |
| 2007/0057113 | A1 | | 3/2007 | Parks | |
| 2009/0084907 | A1 | * | 4/2009 | Yoeli | 244/23 R |

* cited by examiner

*Primary Examiner* — Christopher P Ellis
*Assistant Examiner* — Medhat Badawi
(74) *Attorney, Agent, or Firm* — Fogg & Powers LLC

(57) ABSTRACT

A ducted fan air-vehicle capable of generating control moments. The ducted fan air-vehicle includes an air duct, a fan, a center body, a plurality of control vanes. The vanes are independently controlled and are deflected in the same direction but at different angles, thereby providing an increased control moments to the vehicle compared to the prior art. The increased pitching moment allows for additional control authority. Additional control authority is useful in forward flight and is especially desirable when the ducted fan air-vehicle is maneuvering in unsteady or turbulent winds or with various types of cargo that may effect the vehicle center of gravity location.

17 Claims, 6 Drawing Sheets

DIFFERENTIAL VANE VEHICLE CONTROL

GOVERNMENT INTEREST

The invention described herein was made in the performance of work under U.S. Government Contract No. HR0011-05-C-0043, awarded by DARPA (Defense Advanced Research Projects Agency). The Government may have rights to portions of this invention.

RELATED APPLICATION

The application is related to U.S. patent application Ser. No. 12/359,407, filed Jan. 26, 2009, the contents of which are hereby incorporated by reference.

BACKGROUND OF THE INVENTION

Ducted fan air-vehicles typically have at least one ducted fan and a fan engine to drive the fan blades. These vehicles may be preprogrammed to perform operations autonomously, or they may be controlled by a human operator. Ducted fan air-vehicles are well known for excellent stationary hovering aerodynamic performance and have the ability of forward flight.

Ducted fan air-vehicles have become increasingly used in a variety of applications. Such applications include military situations, such as surveillance, reconnaissance, target acquisition, data acquisition, communications relay, decoy, harassment, or supply flights. These vehicles are also used in a growing number of civilian applications, such as fire fighting, police observation, reconnaissance support in natural disasters, and scientific research.

Many of these applications require that the ducted fan air-vehicles carry a variety of payloads or cargo. For example, ducted fan air-vehicles may need to carry visual sensors, infrared sensors, cameras, radio communication devices, inertial sensor units, ground level sensor units, and/or other payloads. This cargo may cause a shift in the center of gravity, which can create negative interference with airflow characteristics inside the duct by blocking air intake and exhaust, and create additional drag on the vehicle when the vehicle is in forward flight. When the vehicle CG changes, the center of lift needs to change in order have the aerodynamic forces balance the forces due to gravity acting on the vehicle.

Ducted fan air-vehicles are designed to have a specific center of gravity in order to be effective and controllable. These vehicles are sensitive to even slight weight redistributions, i.e. any change to the weight distribution can impact the airflow within the duct. Accordingly, even slight modifications to the cargo/payload can negatively impact performance specifically stability. Differing weight distributions are typically dealt with by either developing a new variation of the vehicle or developing an entirely new aircraft for each type of cargo. Both designing a new aircraft and developing a variation of the vehicle are time-consuming and costly.

Furthermore, some flight conditions and mere forward flight can interfere with the desired airflow characteristics and, by implication, flight control and performance. It is important to design the vehicle with the proper CG location (or range of locations), just as for a fixed wing aircraft.

SUMMARY OF THE INVENTION

The present invention provides an example ducted fan air-vehicle that provides differential control of one or more vane pairs to generate a pitching moment. The vanes generate aerodynamic control forces and moments. The primary purpose of the vanes is to generate pitch, roll, and yaw moments to enable control of the vehicle. The pitching moment facilitates control of the vehicle. The control is beneficial in forward flight as well as in extreme conditions, such wind, and gusts. The control could also be used to balance out different types of cargo or counteract shifting cargo.

The vehicle includes an air duct, a fan, a center body, a plurality of control vanes located within or downstream from the air duct, and a separate servo for each control vane for independently controlling each vane. Two adjacent control vanes are deflected in the same direction. The first vane is deflected to a first angle and the second vane is deflected to a second angle different from the first angle. The first angle of the first vane maintains desirable airflow around the second vane. The differential between the two angles allows the first vane to deflect at a greater angle than if the vanes were deflected at the same angle. The increased angle of the first vane allows for an increased pitching moment.

In accordance with further aspects of the invention, a flight control system determines the orientations of the vanes to generate a desired pitching moment and control the movement of the vanes accordingly.

As will be readily appreciated from the foregoing summary, the invention provides a ducted fan air-vehicle capable of generating improved pitching moments through differential vane control.

BRIEF DESCRIPTION OF THE DRAWINGS

Preferred and alternative embodiments of the present invention are described in detail below with reference to the following drawings:

FIG. 3-1 is a side view of a servo mounted on or internal to a vane;

FIG. 3-2 is a side view of a servo mounted external to the vane;

DETAILED DESCRIPTION OF THE INVENTION

Figure 1:
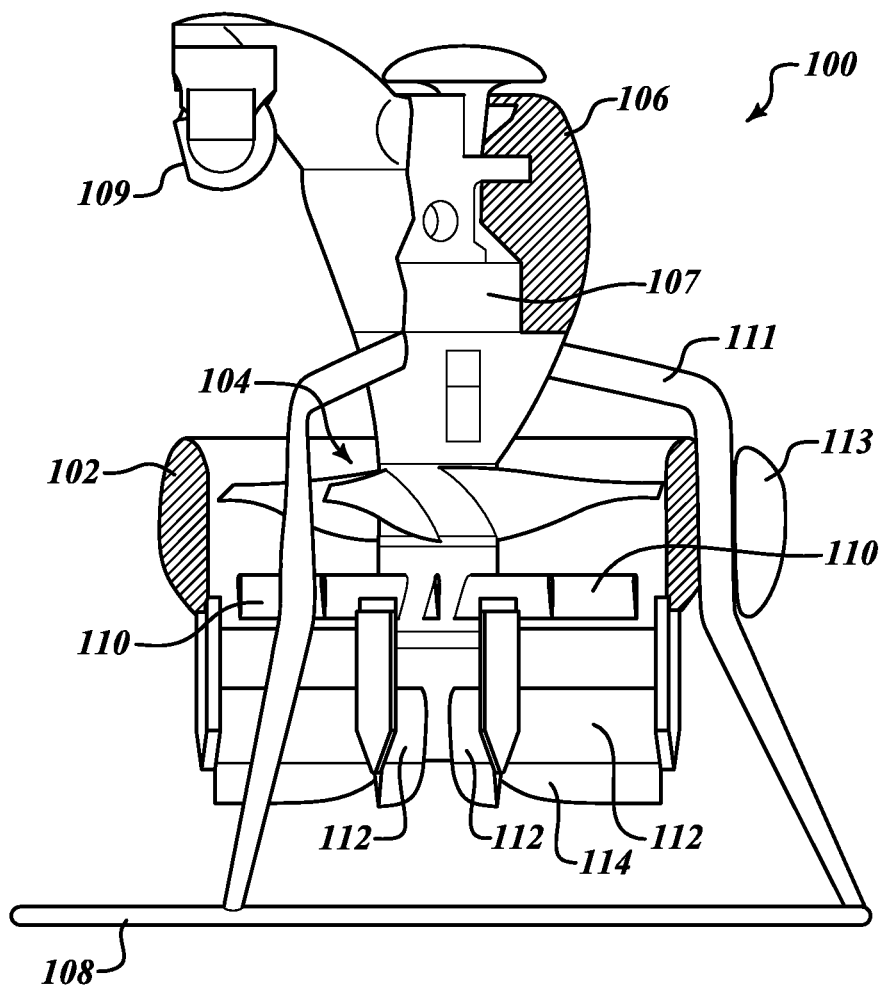
FIG. 1 is a side, partial cross sectional view of a ducted fan air-vehicle.
Figure 2:
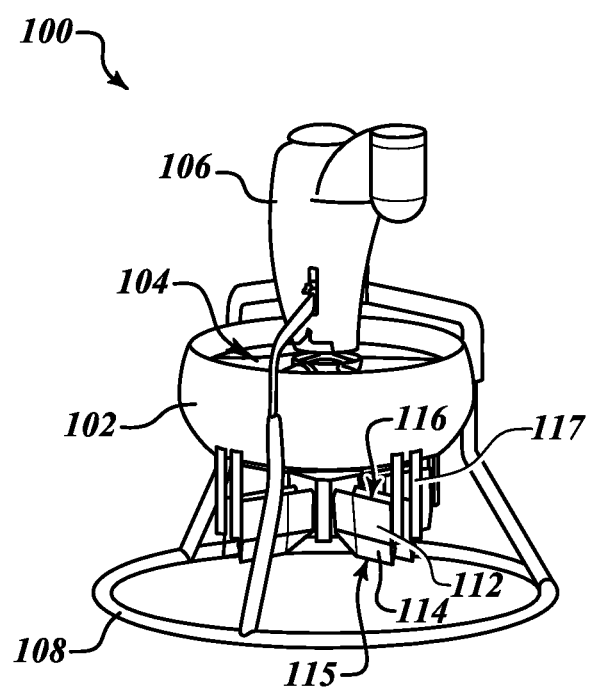
FIG. 2 is a perspective view of a ducted fan air-vehicle with the control vanes in a first position.

FIGS. 1 and 2 show a ducted fan air-vehicle 100 that provides differential control of one or more vane pairs to generate a pitching moment. The ducted fan air-vehicle 100 includes an air duct 102 having a fan 104 located within the air duct 102. The ducted fan air-vehicle may have a center body 106. In this embodiment, the center body 106 is a housing that contains other components of the air-vehicle 100, including an engine 107, a payload or cargo 109, a duct pod 113 and engine mounts 111. The engine 107 powers the air-vehicle 100. The engine mounts 111 support the center body 106. Landing gear 108 is connected to the center body 106 with engine mounts 111. The ducted fan air-vehicle 100 is stabilized when it is on the ground by landing gear 108.

The ducted fan air-vehicle 100 also includes a stator assembly 110. In this embodiment, the stator assembly 110 is located just under the fan 104 in the air duct 102 to reduce or eliminate the swirl and torque produced by the fan 104 by providing the correct amount of anti-torque to counteract engine/fan torque. In this embodiment, the stator assembly 110 adds to the vehicle's structural integrity.

The ducted fan air-vehicle 100 also includes a plurality of fixed or moveable control vanes 112 for providing the necessary forces and moments for vehicle control. The vanes include leading edges 116 and trailing edges 115. The vanes 112 may be located under the fan 104 within the air duct 102. In this embodiment, the vanes 112 are connected to the air duct 102 by control vane supports 117. The vanes 112 may be placed below the exit section of the air duct 102. The vanes 112 are placed in the fan airflow and away from the vehicle center of gravity (CG) location. The farther away the vanes 112 are placed from the CG, the better they are at generating moments for vehicle altitude control. The vanes 112 may also include moveable flap surfaces 114 at a trailing edge 115. The flap surfaces 114 deflect as the vanes 112 are deflected. The moveable flap surfaces 114 enable the control vanes to produce more lift than a single rigid surface.

Figures 1, 3:
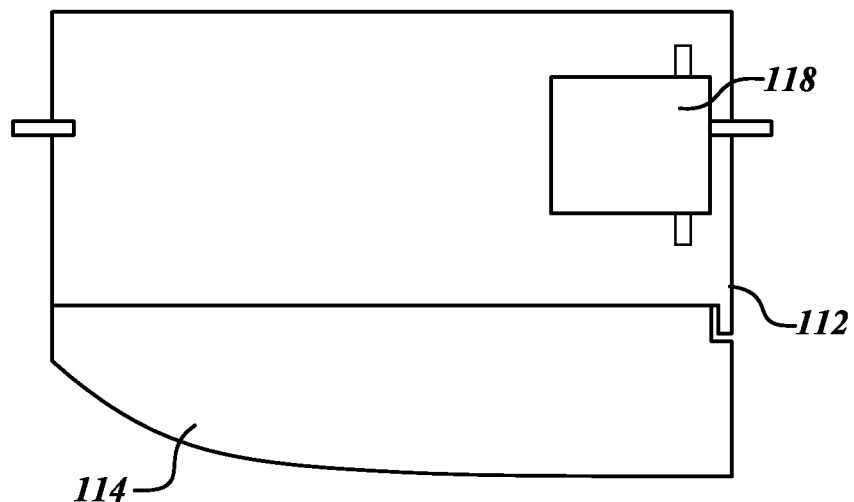
Figures 2, 3:
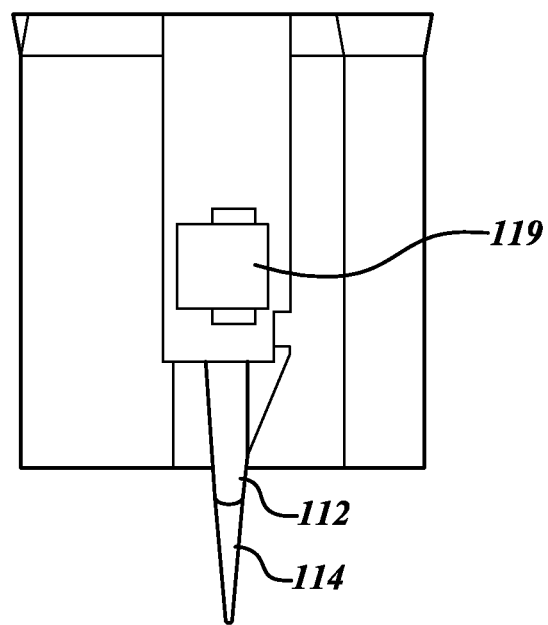
Figure 4:
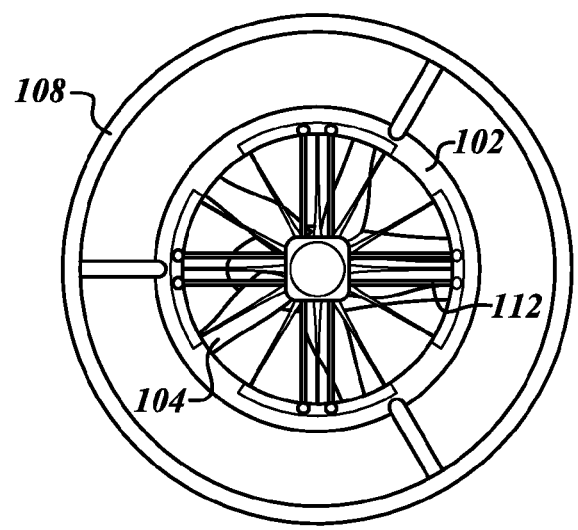
FIG. 4 is a bottom view of an air duct in a standard position.

A servo converts electrical signals to mechanical energy in order to move the vanes 112 to desired orientations. In one embodiment of the present invention, the surface of each vane 112 includes its own servo 118 or method of independent actuation as shown in FIG. 3-1. In an alternative embodiment, an externally mounted servo 119 moves the vanes via a system of linkages as shown in FIG. 3-2. With each vane 112 having its own servo 118, the vanes 112 are free to move independently. In this embodiment, a flight control system which is part of an avionics system, controls the deflection of the vanes 112 by sending command signals to the servos 118. The flight control system is a collection of on-board electronics (sensors, computer, etc.), and is located wherever there is suitable space.

If the vehicle 100 encounters a strong unsteady wind or gust during flight, the wind could cause tilt the vehicle 100 in a different direction than it was originally travelling. In response to the tilt induced by the unsteady conditions, it is desirable for the vehicle 100 to quickly be tilted in response to stabilize its flight and maintain control. To achieve the desired nose-down tilt into the wind, the vehicle 100 must overcome the inherent nose-up pitch moment present on the windward side of the duct lip. Therefore, tilting the vehicle 100 into the wind requires overcoming its natural tendency to pitch away from the oncoming wind.

Figure 5:
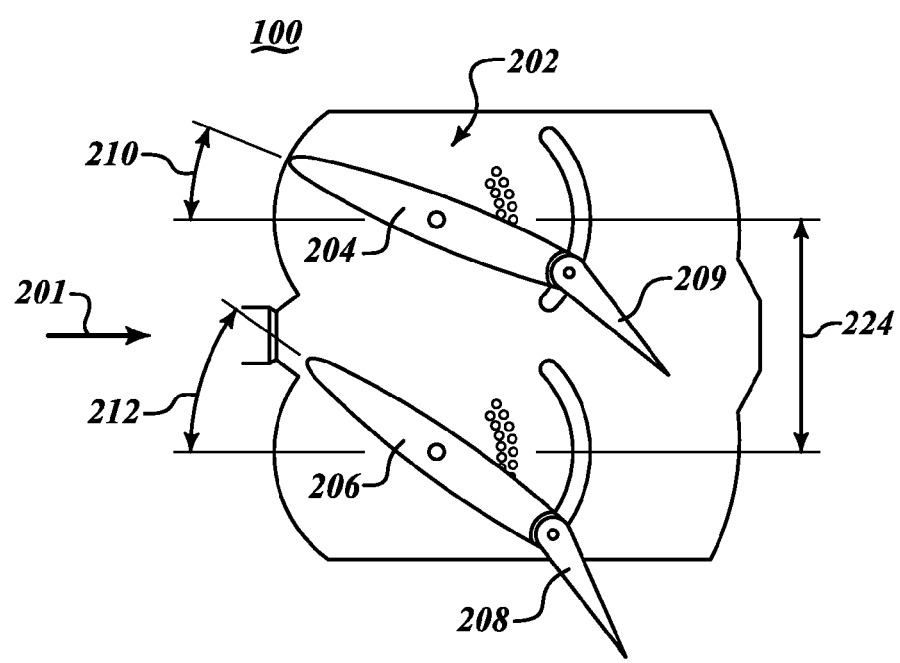
FIG. 5 is an end view of vanes deflected in the same direction but at different angles in accordance with the present invention.

FIG. 5 shows a vane pair 202 in an orientation capable of generating a pitching moment in the ducted fan air-vehicle 100. The vane pair 202 includes a first vane 204 and a second vane 206 deflected in the same direction. The first vane 204 includes a flap surface 209. The second vane 206 includes a flap surface 208. The first vane 204 and the second vane 206 are separated by a distance 224. An arrow 201 represents a general direction of airflow originating from the fan 104. The orientation of the first vane 204 and the arrow 201 define a first angle of attack (AOA) 210, and the orientation of the second vane 206 and the arrow 201 define a second AOA 212.

Traditional ducted fan air-vehicles generate a pitching moment by deflecting the vane pair 202 in the same direction at equal AOAs, i.e. the first AOA 210 and the second AOA 212 are substantially identical. The magnitude of the pitching moment generated depends on the amount of deflection, i.e. greater AOAs 210 and 212 lead to a generated pitching moment with greater magnitude. However, the magnitude of the generated pitching moment is limited because the vane pair 202 is limited in how far it deflects. Specifically, if the vane pair 202 is adjusted beyond a threshold angle, a stall condition is triggered resulting in undesirable air flow over the control vane and a reduced pitching moment is experienced.

The vehicle 100 generates an improved pitching moment by deflecting the vane pair 202 in one direction, but deflecting the individual vanes 204 and 206 at different angles. The orientations of the first vane 204 and the second vane 206 are adjusted so that the second AOA 212 is greater than the first AOA 210. The different orientations of the vane AOAs 210, 212 allow the second vane 206 to extend beyond the tandem threshold angle. The airflow generated by the first vane 204 reduces the stall characteristics of the second vane 206. More specifically, the air flow generated by the first vane 204 allows airflow on a top surface of the second vane 206 to maintain contact an AOA greater than the tandem threshold angle without generating a stall condition. The increased deflection of the second vane 206 beyond the tandem threshold angle allows for the generation of an increased pitching moment, with reduced risk of stalling the control vanes.

Although FIG. 5 shows the vanes 204, 206 being rotated clockwise, they are capable of being deflected in the counter-clockwise direction.

In operation, the differential between AOAs 210 and 212 can vary from 0° to max°. The AOAs 210 and 212 range from a first AOA and end at a max AOA. Deflecting beyond these maximum values can lead to a stall condition. In one embodiment, the differential defined by the first AOA 210 and the second AOA 212 is 10 degrees. In another embodiment, the differential defined by the first AOA 210 and the second AOA 212 is 20 degrees. The specific differential defined by AOAs 210 and 212 that generates the desired balance between generated pitching moment/reduced thrust depends on the properties of the specific ducted fan air-vehicle such as the distance 224 between the first vane 204 and the second vane 206. Thus, the differential defined by the first AOA 210 and the second AOA 212 may smaller than 10 degrees, larger than 20 degrees or any angle in-between. Other properties that influence the desired angular difference between the two vanes include: chord length of vanes, vane airfoil shape, vane flap design, Reynolds number). In one embodiment, the optimal vane deflection values for generating various pitching moments for various vehicle configurations are stored in a look-up table included in the avionics system.

In one embodiment, more than one pair of adjacent vanes are deflected in the same direction at different AOAs. In other words, multiple pairs of adjacent vanes (FIG. 2) are deflected at different AOAs to generate a desired combination of control moments for executing desired movements.

Compared to traditional methods where the vanes 112 are deflected in tandem, the inventive differential control of the vane pairs generates an improved pitching moment and thereby facilitates improved control of the vehicle 100. The improved control could be used in forward flight as well as in extreme conditions, such wind, and gusts. The improved control could also be used to balance out different types of cargo or counteract shifting cargo.

Figure 6:
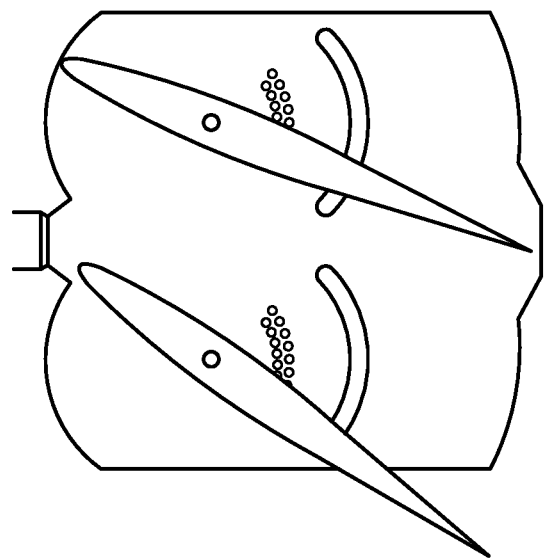
FIG. 6 illustrates an alternate embodiment for the vanes.

FIG. 6 is an embodiment for the vanes where the vanes do not include flap surfaces such as that shown in FIG. 5. The motion of the vanes relative to each other is similar to that described above, thereby providing the benefit of differential deflection.

Figure 7:
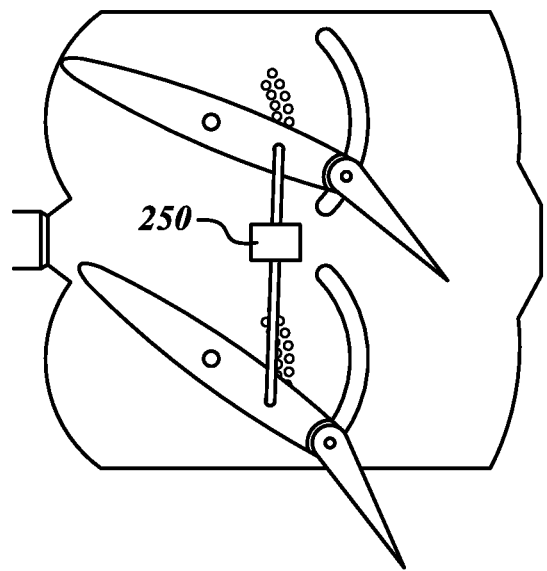
FIG. 7 illustrates an embodiment having a mechanical linkage between the vanes.

FIG. 7 illustrates an embodiment that includes a mechanical linkage 250 connected between the vanes. The mechanical linkage 250 is configured to apply differential deflection of the vanes as described above. For example, as one of the vanes moves the mechanical linkage 250 moves the other vane in accordance with the desired motion described above.

Figure 8:
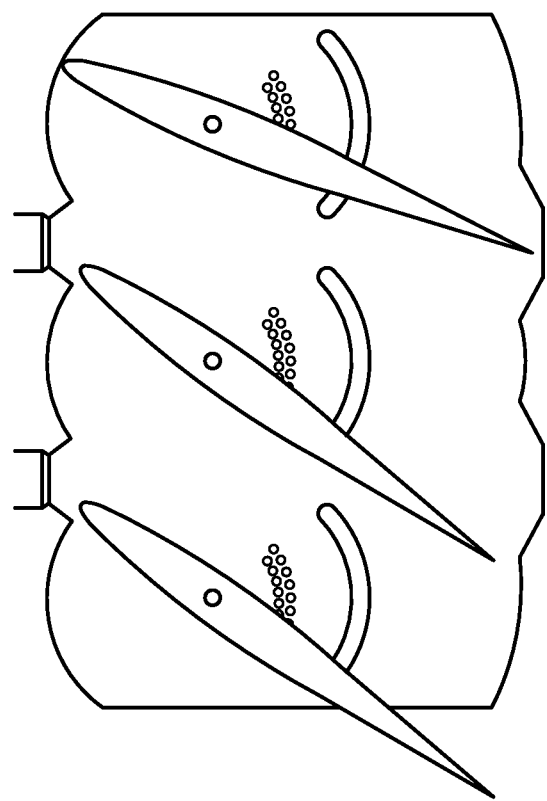
FIG. 8 illustrates an embodiment having more than two vanes in a section.

FIG. 8 shows an embodiment with more than two vanes working in cooperation to provide controlling forces. Each of the vanes may be driven to different angles as they near a stall position thereby improving the airflow over the adjacent vane.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ducted fan air-vehicle comprising:
an air duct;
a fan located within the air duct;
a center body attached to the air duct and the fan;
a plurality of groups of adjacent control vanes located within or downstream from the air duct, each group comprises at least two vanes; and
a control device configured to control each vane,
wherein the vanes of at least one of the groups of adjacent control vanes are deflected in the same direction, a first vane of the group deflected at a first angle of attack (AOA) and a second vane of the pair deflected at a second AOA different from the first AOA and exceeding a tandem threshold angle;
wherein the first AOA is selected to allow the second AOA to exceed the tandem threshold angle without generating a stall condition;
wherein the tandem threshold angle is an angle at which a stall condition occurs if exceeded by all vanes of a group operating at approximately a same AOA.

2. The vehicle of claim 1, wherein the position of the first vane is configured to maintain airflow around the second vane in order to avoid a stall condition.

3. The vehicle of claim 1, wherein the first vane and the second vane are deflected so that the first AOA differs from the second AOA by at least 10 degrees.

4. The vehicle of claim 1, wherein the control device comprises at least one look up table comprising at least one of pitching moment values or thrust values associated with a plurality of AOAs.

5. The vehicle of claim 4, wherein the control device is configured to determine values for the first AOA and the second AOA based on the values in the look up table and a desired pitching moment.

6. The vehicle of claim 5, wherein the control device comprises a plurality of servo devices configured to independently control each vane.

7. The vehicle of claim 1, wherein at least one of the groups comprises more than two adjacent control vanes.

8. The vehicle of claim 1, wherein the control device comprises mechanical linkage device coupled to adjacent vanes, the mechanical linkage device configured to control position of the vanes.

9. A method for controlling a ducted fan air-vehicle, the method comprising:

in a first operational mode, deflecting first and second vanes of a group of at least two adjacent vanes at a first AOA in the same direction to generate a pitching moment,
wherein the first AOA can be adjusted up to a tandem threshold angle,
wherein the tandem threshold angle is an angle at which a stall condition occurs if exceeded by all vanes of a group operating at approximately a same AOA;
in a second operational mode, deflecting the first vane at a second AOA and the second vane at a third AOA in the same direction, wherein the second and third AOA are different,
wherein the second AOA is selected to allow the third AOA to exceed the tandem threshold angle.

10. The method of claim 9, further comprising determining the first AOAs in both operational modes based on data from a look up table and a desired pitching moment.

11. The method of claim 9, further comprising applying the operational modes to more than one group of adjacent vanes on the ducted fan air-vehicle to generate a desired pitching moment.

12. A ducted fan air-vehicle comprising:
an air duct;
a fan located within the air duct;
a center body attached to the air duct and the fan;
a plurality of groups of adjacent control vanes located within or downstream from the air duct, each group comprises at least two vanes; and
a control device configured to control each vane,
wherein the vanes of at least one of the groups of adjacent control vanes are nonuniformly deflected while exposed to uniform airflow,
wherein uniform airflow describes airflow at the vanes at approximately a same angle and velocity;
wherein the vanes are deflected in the same direction with a first vane of the group deflected at a first angle of attack (AOA) and a second vane of the pair deflected at a second AOA different from the first;
wherein the first AOA is selected to allow the second AOA to exceed the tandem threshold angle without generating a stall condition;
wherein the tandem threshold angle is an angle at which a stall condition occurs if exceeded by all vanes of a group operating at approximately a same AOA.

13. The vehicle of claim 12, wherein the control device comprises at least one look up table comprising at least one of pitching moment values or thrust values associated with a plurality of AOAs.

14. The vehicle of claim 12, wherein the control device is configured to determine values for the first AOA and the second AOA based on the values in the look up table and a desired pitching moment.

15. The vehicle of claim 12, wherein at least one of the groups comprises more than two adjacent control vanes.

16. The vehicle of claim 12, wherein the control device comprises a plurality of servo devices configured to independently control each vane.

17. The vehicle of claim 12, wherein the control device comprises a mechanical linkage device coupled to adjacent vanes, the mechanical linkage device configured to control the relative position of the adjacent vanes.

* * * * *